No. 889,334. PATENTED JUNE 2, 1908.
F. E. REMARK.
ARMOR FOR TIRES.
APPLICATION FILED NOV. 21, 1906.

Witnesses:
Edna Bort
Glenara Fox

Inventor,
Frank E. Remark,
by C. E. Humphrey.
Atty.

UNITED STATES PATENT OFFICE.

FRANK E. REMARK, OF AKRON, OHIO.

ARMOR FOR TIRES.

No. 889,334.　　　Specification of Letters Patent.　　　Patented June 2, 1908.

Application filed November 21, 1906. Serial No. 344,484.

*To all whom it may concern:*

Be it known that I, FRANK E. REMARK, a citizen of the United States, residing at Akron, in the county of Summit and State of Ohio, have invented new and useful Improvements in Armors for Tires, of which the following is a specification.

This invention has relation to armor for tires, and the object thereof is to provide a simple, effective device for simultaneously preventing skidding, increasing the traction and decreasing the liability of puncture of a tire.

In accomplishing the foregoing results, I employ an annular jacket or covering for the tire composed of link or chain mail of such shape that it will cover not only the tread, but a portion of the sides of the tire and be securely maintained in position by the inflation thereof, without the use of auxiliary retaining means. This link or chain mail jacket is composed of links especially designed for the purpose, which will, when united together to form the device, constitute a comparatively soft and yieldable covering for the outer portion of a tire and will unite or adhere so snugly thereto as to prevent any danger of a tire slipping, and so effectually cover the same as to eliminate all ordinary dangers of puncture.

With the foregoing and other objects in view, the invention consists in the novel construction, combination and arrangement of parts constituting the invention to be hereinafter referred to and illustrated in the accompanying drawings which form a part of this specification in which is shown the preferred embodiment of the invention, but it is to be understood that changes, variations and modifications can be resorted to which come within the scope of the claims hereunto appended.

Figure 1:
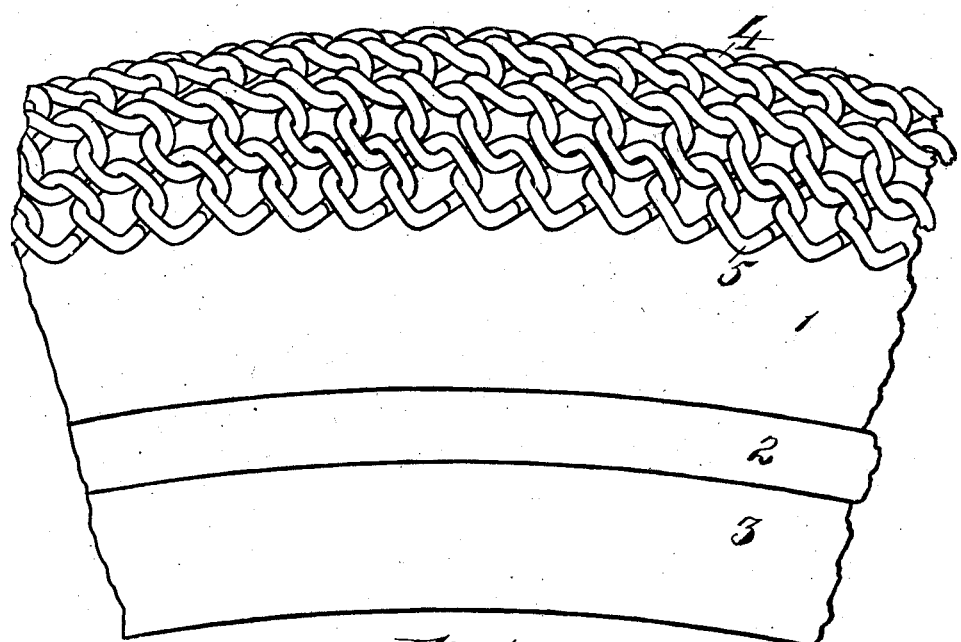
Figure 2:
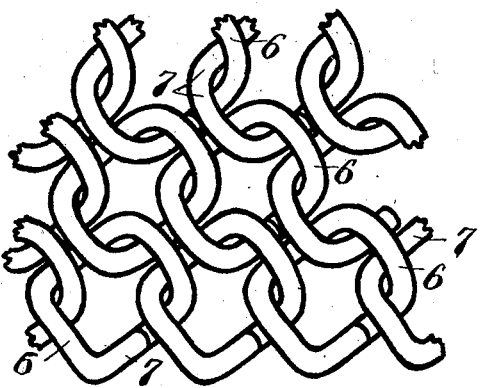

In the drawings, in which similar reference numerals indicate like parts in the different figures: Figure 1 is a side elevation of a section of a pneumatic tire with my improved armor in position thereon; and, Fig. 2 is an enlarged detail of the armor to better illustrate the construction thereof.

In the drawings, the reference numeral 1 indicates a pneumatic tire mounted on a rim 2 seated on a felly 3. The construction of the tire 1, rim 2 and felly 3 are immaterial to the understanding of the invention; but as the invention is usually employed on a pneumatic tire, this type is shown in the drawings as being the preferred one to best illustrate this invention.

Surrounding the tire 1 is a jacket or covering 4 composed of a plurality of interlocking links 5 so shaped and united together with reference to each other, that the device when complete, will cover not only the tread portion, but a portion of the sides of the tire.

The device is preferably made endless and is of such a shape and size that when the tire 1 is inflated, it will be blown against the inner surface of the armor and retain the same securely in position, solely by reason of the pressure exerted by the tire against its under surface.

In order to make the contour of the armor conform to the configuration of the tire, the links 5 along the sides of the device are made slightly smaller than those near the tread portion; and in order to do this effectually, each longitudinal row of links from the sides upwardly towards the central line of the tread portion of the tire increases slightly in size. These links composing this device are preferably made with rounded corners and with two end portions thereof elevated sufficiently to enable them to engage the links with which they interlock, smoothly and perfectly.

It will be noted that each link is arranged to interlock with four adjacent links, the only exception to this being the lower or outside line of links, which only engage three adjoining links; consequently, it is necessary when forming these links that those portions designated in the drawings by the reference numeral 6 will be raised or elevated sufficiently to permit them to overlap the portions 7 of the adjoining links, so that a smooth sheet of armor results therefrom. It will be seen further that the transverse lines of links are slightly oblique to the central line of the tire, and the positioning of these links in this manner adds greatly to their effectiveness in obtaining proper traction on the ground when in use. It will also be seen that by constructing this armor in such a manner that each link engages four adjacent links the strength of the same is greatly increased.

What I claim and desire to secure by Letters Patent, is:—

A chain armor for tires formed of a plurality of rows of links circumferentially disposed with respect to the tire of the wheel, each of the links of said rows of links substantially rectangular in contour and having rounded corners, the end portions of each of said links bent above the plane in which is positioned the intermediate portion, each of the links of each row with the exception of the links of each outer row interlocking with four adjacent links, each of the links of the outer row interlocking with three adjacent links, said links gradually increasing in width and length towards the center of the armor.

In testimony whereof I have hereunto set my hand in presence of two subscribing witnesses.

FRANK E. REMARK.

Witnesses:
C. E. HUMPHREY,
GLENARA FOX.